United States Patent
Hu et al.

(10) Patent No.: US 9,377,632 B2
(45) Date of Patent: Jun. 28, 2016

(54) LENS DRIVING DEVICE WITH 3D ELASTIC SUPPORT STRUCTURE

(71) Applicant: TDK TAIWAN CORP., Yangmei (TW)

(72) Inventors: Chao-Chang Hu, Yangmei (TW);
Fu-Yuan Wu, Yangmei (TW);
Shih-Ting Huang, Yangmei (TW);
Jyun-Jie Lin, Yangmei (TW); Yi-Ho Chen, Yangmei (TW)

(73) Assignee: TDK TAIWAN CORP., Yangmei (TW)

( * ) Notice: Subject to any disclaimer, the term of this patent is extended or adjusted under 35 U.S.C. 154(b) by 99 days.

(21) Appl. No.: 14/305,609

(22) Filed: Jun. 16, 2014

(65) Prior Publication Data

US 2014/0368914 A1    Dec. 18, 2014

Related U.S. Application Data

(60) Provisional application No. 61/836,038, filed on Jun. 17, 2013.

(51) Int. Cl.
| | |
|---|---|
| *G02B 27/64* | (2006.01) |
| *G02B 7/09* | (2006.01) |
| *G02B 7/08* | (2006.01) |
| *H04N 5/232* | (2006.01) |

(52) U.S. Cl.
CPC ............... *G02B 27/646* (2013.01); *G02B 7/08* (2013.01); *G02B 7/09* (2013.01); *H04N 5/23264* (2013.01)

(58) Field of Classification Search
None
See application file for complete search history.

(56) References Cited

U.S. PATENT DOCUMENTS

| | | | |
|---|---|---|---|
| 2011/0217029 A1* | 9/2011 | Wu et al. | 396/55 |
| 2012/0224075 A1* | 9/2012 | Lim et al. | 348/208.11 |

\* cited by examiner

*Primary Examiner* — Arnel C Lavarias
(74) *Attorney, Agent, or Firm* — Bacon & Thomas, PLLC

(57) ABSTRACT

A lens driving device includes a lens holder for holding a lens having an optical axis; a focusing coil disposed at a periphery of the lens with respect to the optical axis; an optical image stabilizer (OIS) coil structure including a plurality of coils; a circuit structure connected electrically to the OIS coil structure and taking control thereof; a plurality of magnets; and an elastic support structure, having an upper plate spring portion and a plurality of suspension wires, wherein each suspension wire is disposed substantially parallel with the optical axis and integrally formed with the upper plate spring portion at one end and connected electrically to the circuit structure at the other end.

22 Claims, 17 Drawing Sheets

LENS DRIVING DEVICE WITH 3D ELASTIC SUPPORT STRUCTURE

CROSS-REFERENCE TO RELATED APPLICATION

This application claims benefit of U.S. Provisional Patent Application No. 61/836,038, filed Jun. 17, 2013, the entire contents of which are hereby incorporated by reference.

BACKGROUND OF THE INVENTION

1. Field of the Invention

The present invention relates to a lens driving device with 3D elastic support structure, and more particularly, to a lens driving device using a voice coil motor (VCM).

2. Description of the Prior Art

Miniature cameras are becoming increasingly common in mobile electronic devices such as mobile phone and tablet PC. There is a constant drive to improve performance of such cameras, while still maintaining the same envelope. Demands on improvements to performance of such miniature cameras are constant, as are demands for continued miniaturization, given the added features and devices added to such mobile electronic devices. In particular, high image quality requires the lens motion along the optical axis to be accompanied by minimal parasitic motion in the other degrees of freedom, particularly tilt about axes orthogonal to the optical axis. This requires the suspension mechanism to be stiff to such parasitic motions. However, given the need to control the lens position with a resolution of 1 micron, such suspension mechanisms must account for friction.

FIG. 15 is a schematic view showing the main structure of a conventional lens driving device for a voice coil motor (VCM). For the convenience of description, some minor parts of the lens driving device are not shown. As shown in FIG. 15, the lens driving device 15 includes mainly an first upper plate spring 1511, an second upper plate spring 1512, a lens holder 152, a focusing coil 153, an optical image stabilizer (OIS) coil structure 154, and a flexible printed circuit 155.

The lens driving device 15 further includes two first suspension wires 1561~1562 and two second suspension wires 1563 and 1564. The first suspension wires 1561 and 1562 are respectively connected electrically to the flexible printed circuit 155 with one end and connected electrically to the first upper plate spring 1511 with the other end. The second suspension wires 1563 and 1564 are respectively connected electrically to the flexible printed circuit 155 with one end and connected electrically to the second upper plate spring 1512 with the other end. To be noted, the first upper plate spring 1511 and the second upper plate spring 1512 are disposed separately to each other and therefore have no structural connection.

FIG. 16 is a partially enlarged top view showing the electrical connection between the focusing coil and the upper plate spring of the lens driving device of FIG. 15. As shown in FIG. 16, the focusing coil 153 is further connected electrically to the first upper plate spring 1511 with a soldered portion 16. Besides, it is understandable that the focusing coil 153 is also connected electrically to the second upper plate spring 1512 with another soldered portion (not shown).

FIG. 17 is a partially enlarged bottom view showing the electrical connection between the flexible printed circuit and the suspension wire and the connection between the upper plate spring and the suspension wire, of the lens driving device of FIG. 15. As shown in FIG. 17, the flexible printed circuit 155 is connected electrically to one end of the first suspension wire 1561 with a soldered portion 171, and the first upper plate spring 1511 is further connected electrically to the other end of the first suspension wire 1561 with a soldered portion 172. Besides, not shown in the figures, it is understandable that the flexible printed circuit 155 is connected electrically to one end of the second suspension wire 1562 with a soldered portion 17, and the first upper plate spring 1511 is further connected electrically to the other end of the second suspension wire 1562 with another soldered portion.

Similarly, not shown in the figures, the flexible printed circuit 155 is connected electrically to one end of the second suspension wire 1563 with a soldered portion, and the second upper plate spring 1512 is further connected electrically to the other end of the second suspension wire 1563 with another soldered portion. Also, the flexible printed circuit 155 is connected electrically to one end of the second suspension wire 1564 with a soldered portion, and the second upper plate spring 1512 is further connected electrically to the other end of the second suspension wire 1564 with another soldered portion.

Due to the use of the soldered portions, which increases the process difficulty and the weight of device, there is a strong desire, for a given size of camera, to fit bigger lenses and image sensors to improve image quality, and hence there is a desire to reduce the parts number and to eliminate the soldering process for connecting the suspension wire with the upper plate springs.

SUMMARY OF THE INVENTION

In view of the aforementioned problems in the conventional technique, an object of the present invention is to provide a lens driving device with 3D elastic support structure, where the four suspension wires are all in one-piece form with or integrally formed with an upper plate spring portion, so as to reduce the parts number and to eliminate the soldering process thereof.

According to the object of the present invention, there is provided a lens driving device, including: an elastic support structure, having an upper plate spring portion and a plurality of suspension wires; a lens holder for holding a lens having an optical axis; a focusing coil disposed at a periphery of the lens with respect to the optical axis; an optical image stabilizer (OIS) coil structure comprising a plurality of coils; a circuit structure connected electrically to the OIS coil structure and taking control thereof; a plurality of magnets; wherein the upper plate spring portion including at least a first upper plate spring and at least a second upper plate spring disposed separately with the first upper plate spring; wherein each suspension wire disposed substantially parallel with the optical axis and integrally formed with the upper plate spring portion at one end and connected electrically to the circuit structure at the other end.

Preferably, the upper plate spring portion elastically holds the lens holder along the optical axis.

Preferably, the upper plate spring portion disposed on the top surface of the lens holder.

The focusing coil is connected electrically to the first upper plate spring and the second upper plate spring.

Preferably, the first upper plate spring includes an inner portion and an outer portion connected electrically thereto, the second upper plate spring includes an inner portion and an outer portion connected electrically thereto, each the first suspension wire is integrally formed with the outer portion of the first upper plate spring at one end and is connected electrically to the circuit structure at the other end, and each the second suspension wire is integrally formed with the outer portion of the second upper plate spring at one end and is connected electrically to the circuit structure at the other end. Besides, the focusing coil is connected electrically to the inner portion of the first upper plate spring and the inner portion of the second upper plate spring.

Preferably, the first upper plate spring comprises an inner portion and an outer portion having no electrical connection thereto, the second upper plate spring comprises an inner portion and an outer portion having no electrical connection thereto, each the first suspension wire is integrally formed with the outer portion of the first upper plate spring at one end and is connected electrically to the circuit structure at the other end, and each the second suspension wire is integrally formed with the outer portion of the second upper plate spring at one end and is connected electrically to the circuit structure at the other end. Besides, the focusing coil is connected electrically to the outer portion of the first upper plate spring and the outer portion of the second upper plate spring.

Preferably, the OIS coil structure is disposed on a plane perpendicular to the optical axis.

Preferably, the plurality of magnetic includes: a plurality of first magnets respectively having a first surface facing to the focusing coil; and a plurality of second magnets respectively having a second surface facing to the respective coil of the OIS coil structure.

Preferably, the first magnets are the same with or different from the second magnets.

Preferably, the circuit structure is a flexible printed circuit.

Preferably, the number of the first suspension wires is the same with that of the second suspension wires.

Preferably, the number of the first suspension wires is 2.

DETAILED DESCRIPTION OF THE PREFERRED EMBODIMENTS

The present invention will be more fully described hereinafter with embodiments and the accompanying drawings. Please refer to the drawings for the reference signs used in the description.

Figure 1:
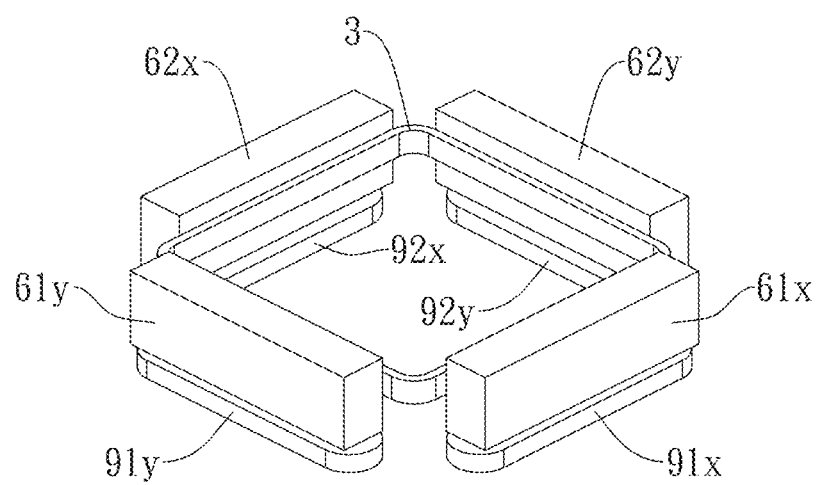
FIG. 1 illustrates a schematic perspective view of the present lens driving device with the common magnet scheme, in which upper and lower spring plates and a lens assembly are omitted for clearly showing arrangement of AF coil, OIS coils and magnets.
Figure 2:
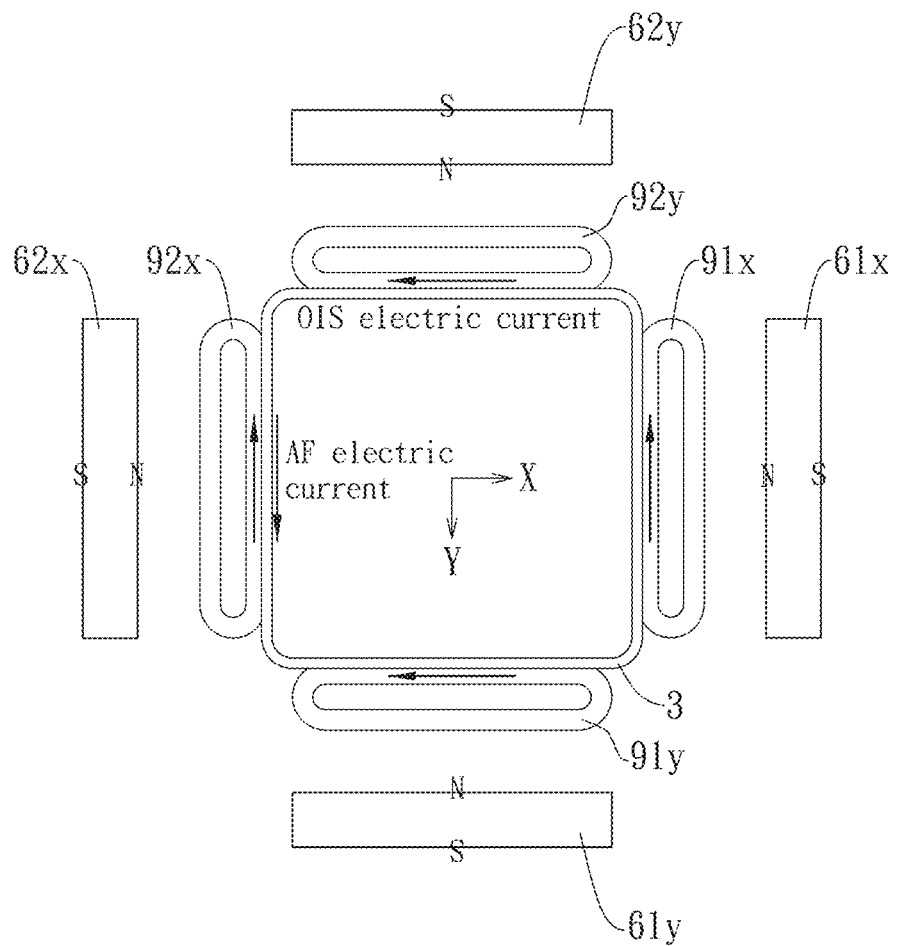
FIG. 2 is a schematic top exploded view of FIG. 1, and illustrating a magnetic field distribution in the structure of FIG. 1.

The present lens driving device is based on a Voice Coil Motor structure and provides auto-focusing and optical image stabilization (OIS) functions. The two functions can be realized by a common magnet scheme or a separate magnet scheme. FIG. 1 illustrates a schematic perspective view of the present lens driving device with the common magnet scheme, in which upper and lower spring plates and a lens assembly are omitted for clearly showing arrangement of AF coil, OIS coils and magnets. FIG. 2 is a schematic top exploded view of FIG. 1, and illustrating a magnetic field distribution in the structure of FIG. 1. As shown in FIG. 1, the present lens driving device mainly comprises a lens assembly (not shown) having an optical axis, an auto-focusing coil (AF coil) 3, an OIS coil set, and a plurality of magnets $61x$, $61y$, $62x$, $62y$. In the present invention, a Z-axis is defined as the optical axis. The AF coil 3 and the magnets $61x$, $61y$, $62x$, $62y$ are disposed around an outer surrounding of the lens assembly with respect to the optical axis. The OIS coil set includes a plurality of OIS coils $91x$, $91y$, $92x$, $92y$ that are disposed on a plane perpendicular to the optical axis. Each of the magnets $61x$, $61y$, $62x$, $62y$ has an inner N pole and an outer S pole. The AF coil 3 and OIS coil set share the common magnet composed of the magnets $61x$, $61y$, $62x$, $62y$. Each of the magnets $61x$, $61y$, $62x$, $62y$ has a first surface and a second surface. The first surface of each of the magnets $61x$, $61y$, $62x$, $62y$ faces the AF coil 3 and the second surface of each of the magnets $61x$, $61y$, $62x$, $62y$ faces one of the OIS coils $91x$, $91y$, $92x$, $92y$, respectively, so that the OIS coils $91x$, $91y$, $92x$, $92y$ are disposed under the magnets $61x$, $61y$, $62x$, $62y$. Electromagnetic driving force is generated in the AF coil 3 by AF electric current and the common magnet to perform auto-focusing function. Electromagnetic driving force is generated in the OIS coil set by OIS electric current and the common magnet to perform the OIS function (i.e. anti-shaking function). Specifically, the AF coil 3 interacts with the first surface of each of the magnets $61x$, $61y$, $62x$, $62y$, whereby the AF coil 3 and the lens assembly can move along the optical axis with respect to the magnets 61x, 61y, 62x, 62y to perform the auto-focusing function. A direction of the OIS coil 91x interacting with the second surface of the magnet 61x is the same with that of the OIS coil 92x interacting with the second surface of the magnet 62x. A direction of the OIS coil 91y interacting with the second surface of the magnet 61y is the same with that of the OIS coil 92y interacting with the second surface of the magnet 62y. The lens assembly, AF coil 3 and the magnets 61x, 61y, 62x, 62y thus can move along directions (i.e. X-axis direction and/or Y-axis direction) perpendicular to the optical axis with respect to the OIS coils 91x, 91y, 92x, 92y to perform the OIS function (i.e. anti-shaking function).

Figure 3:
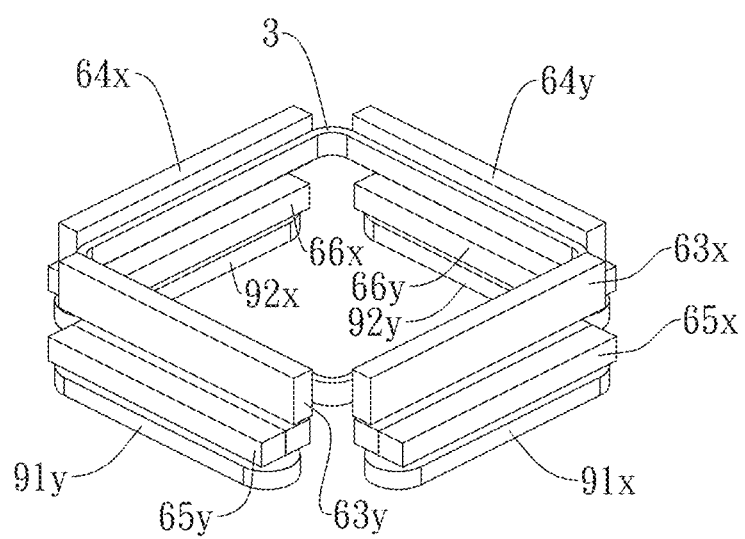
FIG. 3 illustrates a schematic perspective view of the present lens driving device with the separate magnet scheme, in which upper and lower spring plates and a lens assembly are omitted for clearly showing arrangement of AF coil, OIS coils and magnets.
Figure 4:
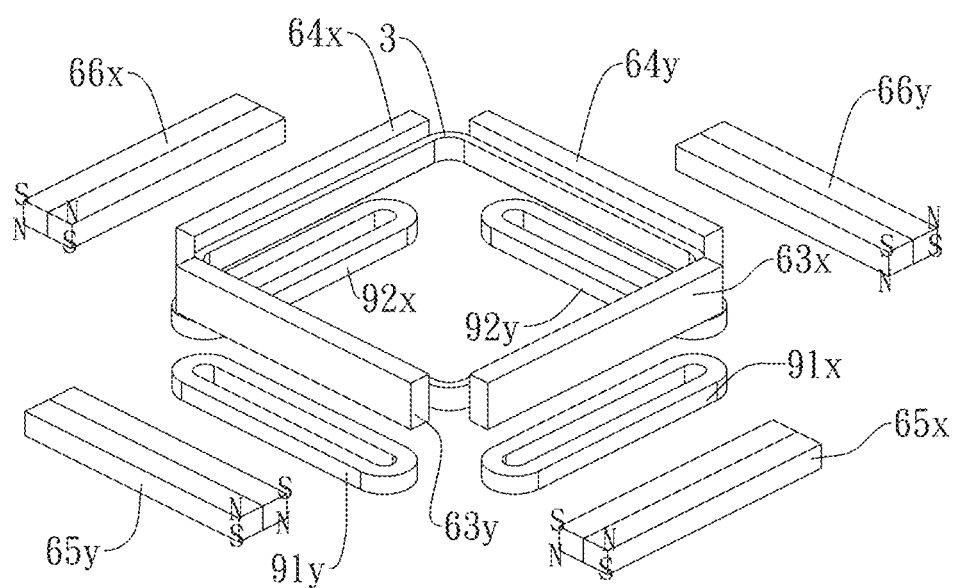
FIG. 4 is a schematic top exploded view of FIG. 3.
Figure 5:
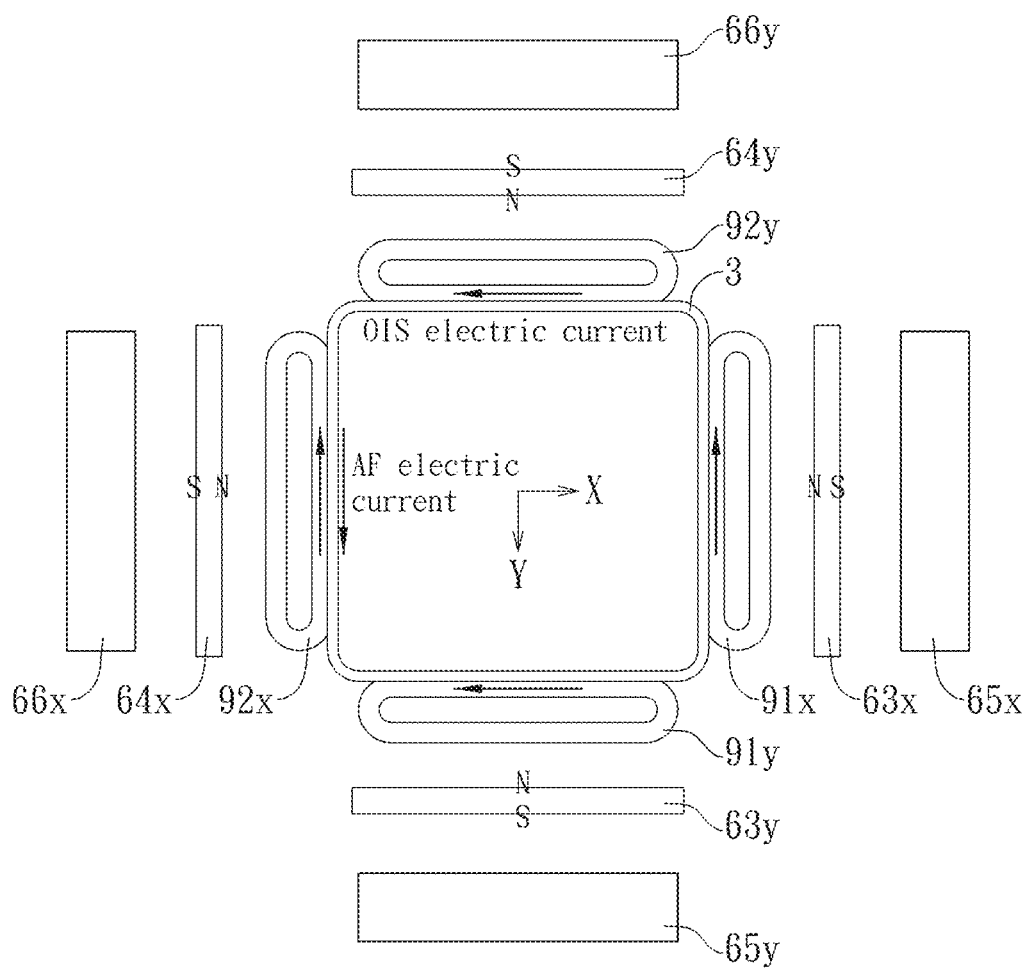
FIG. 5 is a schematic top view of FIG. 4 and illustrating a magnetic field distribution in the structure of FIG. 3.

FIG. 3 illustrates a schematic perspective view of the present lens driving device with the separate magnet scheme, in which upper and lower spring plates and a lens assembly are omitted for clearly showing arrangement of AF coil, OIS coils and magnets. FIG. 4 is a schematic top exploded view of FIG. 3. FIG. 5 is a schematic top view of FIG. 4 and illustrating a magnetic field distribution in the structure of FIG. 3. As shown in FIG. 3, the present lens driving device mainly comprises a lens assembly (not shown) having an optical axis, an auto-focusing coil (AF coil) 3, an OIS coil set, a plurality of AF magnets 63x, 63y, 64x, 64y and a plurality of OIS magnets 65x, 65y, 66x, 66y. The AF coil 3, AF magnets 63x, 63y, 64x, 64y and the OIS magnets 65x, 65y, 66x, 66y are disposed around an outer surrounding of the lens assembly with respect to the optical axis. The OIS magnets 65x, 65y, 66x, 66y are positioned below the AF magnets 63x, 63y, 64x, 64y. The OIS coil set includes a plurality of OIS coils 91x, 91y, 92x, 92y that are disposed on a plane perpendicular to the optical axis and under the OIS magnets 65x, 65y, 66x, 66y. The OIS coils 91x, 91y, 92x, 92y sequentially face the OIS magnets 65x, 65y, 66x, 66y. Each of the AF magnets 63x, 63y, 64x, 64y has an inner N pole and an outer S pole. Electromagnetic driving force is generated in the AF coil 3 by AF electric current and the AF magnets 63x, 63y, 64x, 64y to perform auto-focusing function. Electromagnetic driving force is generated in the OIS coil set by OIS electric current and the OIS magnets 65x, 65y, 66x, 66y to perform the OIS function (i.e. anti-shaking function). Specifically, the AF coil 3 interacts with each of the AF magnets 63x, 63y, 64x, 64y, whereby the AF coil 3 and the lens assembly can move along the optical axis with respect to the AF magnets 63x, 63y, 64x, 64y to perform the auto-focusing function. A direction of the OIS coil 91x interacting with the OIS magnet 65x is the same with that of the OIS coil 92x interacting with the OIS magnet 66x. A direction of the OIS coil 91y interacting with the OIS magnet 65y is the same with that of the OIS coil 92y interacting with the OIS magnet 66y. The lens assembly, the AF coil 3, AF magnets 63x, 63y, 64x, 64y and the OIS magnets 65x, 65y, 66x, 66y thus can move along directions (i.e. X-axis direction and/or Y-axis direction) perpendicular to the optical axis with respect to the OIS coils 91x, 91y, 92x, 92y to perform the OIS function (i.e. anti-shaking function).

Embodiment 1

Figure 6:
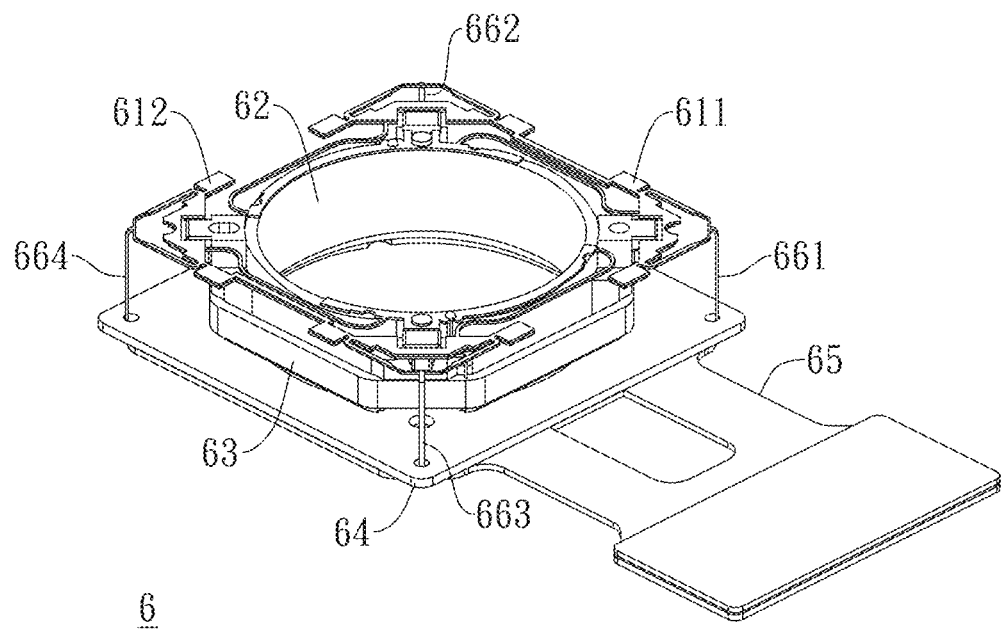
FIG. 6 is a schematic view showing the main structure of a lens driving device for a VCM according to the first embodiment of the present application.

FIG. 6 is a schematic view showing the main structure of a lens driving device for a VCM according to the first embodiment of the present application. For the convenience of description, some minor parts of the lens driving device are not shown. As shown in FIG. 6, the lens driving device 6 includes mainly an elastic support structure, having an upper plate spring portion and a plurality of suspension wires 661~664, a lens holder 62, a focusing coil 63, an optical image stabilizer (OIS) coil structure 64, and a flexible printed circuit 65, wherein the upper plate spring portion includes an first upper plate spring 611 and an second upper plate spring 612, wherein the upper plate spring portion disposed on the top surface of the lens holder 62 to elastically hold the lens holder 62 along the optical axis.

The first upper plate spring 611 and the second upper plate spring 612 are disposed separately with each other and hence have no structural connection therebetween. The lens holder 62 (not shown) is for holding a lens which has an optical axis. The focusing coil 63 is disposed at a periphery of the lens with respect to the optical axis. The OIS coil structure 64 includes a plurality of coils (not shown) thereon and is disposed on a plane perpendicular to the optical axis. The flexible printed circuit 65 is connected electrically to the OIS coil structure 64 and takes control electrically of the OIS coil structure 64.

The lens driving device 6 includes two first suspension wires 661~662 and two second suspension wires 663 and 664. The first suspension wires 661 and 662 are respectively connected electrically to the flexible printed circuit 65 with one end, connected electrically to the first upper plate spring 611 with the other end, and are disposed substantially parallel with the optical axis. To be noted, the first suspension wires 661 and 662 are respectively integrally formed with or in one-piece form with the first upper plate spring 611.

The second suspension wires 663 and 664 are respectively connected electrically to the flexible printed circuit 65 with one end, connected electrically to the second upper plate spring 612 with the other end, and are disposed substantially parallel with the optical axis. Similarly, the second suspension wires 663 and 664 are respectively integrally formed with or in one-piece form with the second upper plate spring 612.

Figure 7:
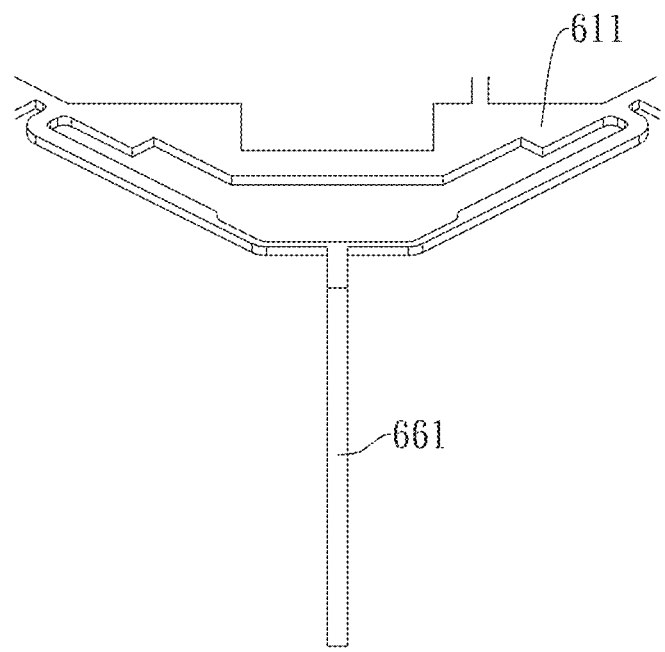
FIG. 7 is a partially enlarged top view showing the upper plate spring integrally-formed with the suspension wire of the lens driving device of FIG. 6.

FIG. 7 is a partially enlarged top view showing the upper plate spring integrally-formed with the suspension wire of the lens driving device of FIG. 6. As shown in FIG. 7, with the integrally-formed structure between the first suspension wires 661 and the first upper plate springs 611, the parts number and be reduced and the soldering process can be eliminated effectively. Similarly, the integrally-formed structures between the other suspension wires 662~664 and the first upper plate springs 611 and 612 have the same function.

Figure 8:
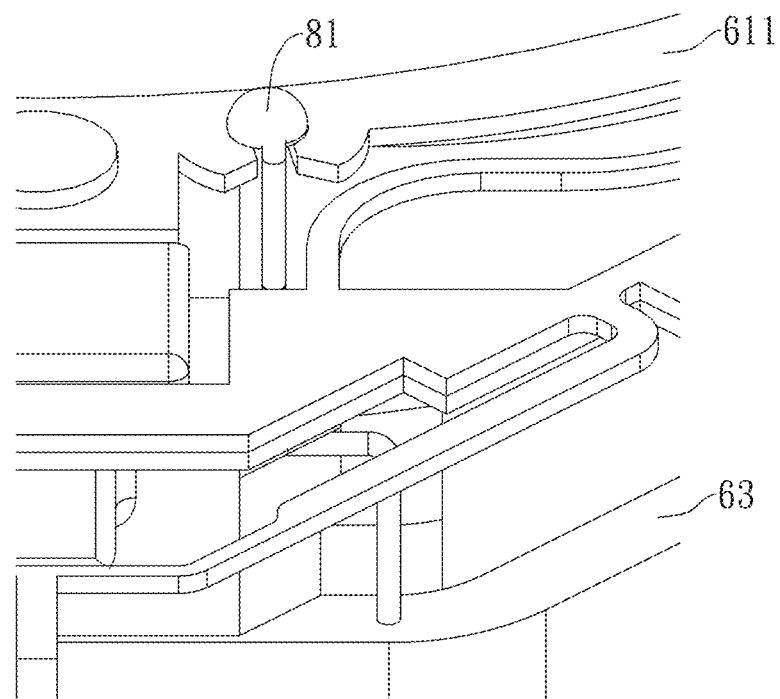
FIG. 8 is a partially enlarged bottom view showing the electrical connection between the focusing coil and the upper plate spring, of the lens driving device of FIG. 6.

FIG. 8 is a partially enlarged bottom view showing the electrical connection between the focusing coil and the upper plate spring, of the lens driving device of FIG. 6. As shown in FIG. 8, the focusing coil 63 is connected electrically to the first upper plate spring 611 with a soldered portion 81. Similarly, not shown in the figures, the focusing coil 63 is further connected electrically to the second upper plate spring 612 with another soldered portion. Therefore, the focusing coil 63 is connectedly to the first upper plate spring 611 and the second upper plate spring 612, so as to form a electrical loop of the flexible printed circuit 65, the four suspension wires 661~664, the upper plate springs 611~612, and the focusing coil 63.

Embodiment 2

Figure 9:
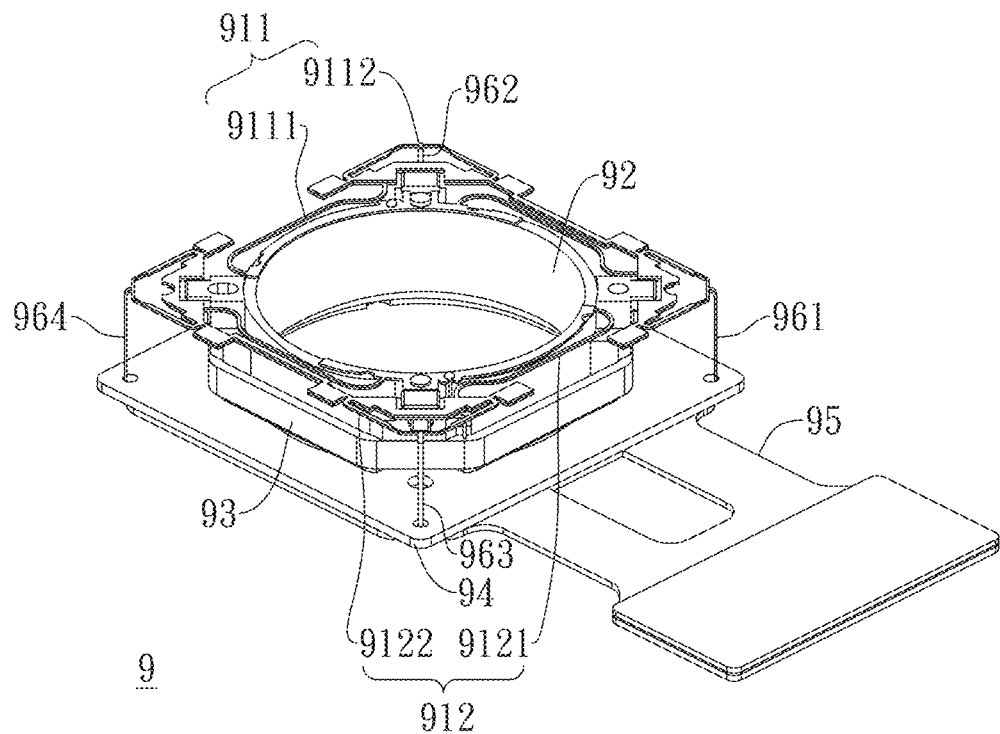
FIG. 9 is a schematic view showing the main structure of a lens driving device for a VCM according to the second embodiment of the present application.

FIG. 9 is a schematic view showing the main structure of a lens driving device for a VCM according to the second embodiment of the present application. For the convenience of description, some minor parts of the lens driving device are not shown. As shown in FIG. 9, the lens driving device 9 includes mainly an elastic support structure, having an upper plate spring portion and a plurality of suspension wires 961~964, a lens holder 92, a focusing coil 93, an OIS coil structure 94, and a flexible printed circuit 95, wherein the upper plate spring portion includes an first upper plate spring 911 which includes an inner portion 9111 and an outer portion 9112, an second upper plate spring 912 which includes an inner portion 9121 and an outer portion 9122, wherein the upper plate spring portion disposed on the top surface of the lens holder 92 to elastically hold the lens holder 92 along the optical axis.

The first upper plate spring 911 and the second upper plate spring 912 are disposed separately with each other and hence have no structural connection therebetween. The lens holder 92 (not shown) is for holding a lens which has an optical axis. The focusing coil 93 is disposed at a periphery of the lens with respect to the optical axis. The OIS coil structure 94 includes a plurality of coils (not shown) thereon and is disposed on a plane perpendicular to the optical axis. The flexible printed circuit 95 is connected electrically to the OIS coil structure 94 and takes control electrically of the OIS coil structure 94.

The lens driving device 9 includes two first suspension wires 961~962 and two second suspension wires 963 and 964. The first suspension wires 961 and 962 are respectively connected electrically to the flexible printed circuit 95 with one end, connected electrically to the outer portion 9112 of the first upper plate spring 911 with the other end, and are disposed substantially parallel with the optical axis. To be noted, the first suspension wires 961 and 962 are respectively integrally formed with or in one-piece form with outer portion 9112 of the first upper plate spring 911.

The second suspension wires 963 and 964 are respectively connected electrically to the flexible printed circuit 95 with one end, connected electrically to the outer portion 9122 of the second upper plate spring 912 with the other end, and are disposed substantially parallel with the optical axis. Similarly, the second suspension wires 963 and 964 are respectively integrally formed with or in one-piece form with the outer portion 9122 of the second upper plate spring 612.

Figure 10:
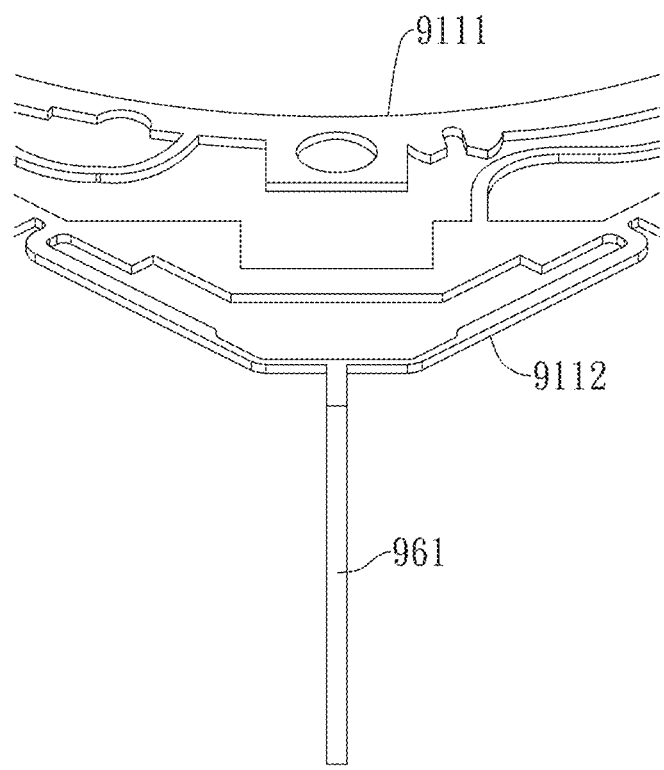
FIG. 10 is a partially enlarged top view showing the outer portion of the upper plate spring integrally-formed with the suspension wire of the lens driving device of FIG. 9.

FIG. 10 is a partially enlarged top view showing the outer portion of the upper plate spring integrally-formed with the suspension wire of the lens driving device of FIG. 9. As shown in FIG. 10, with the integrally-formed structure between the first suspension wires 961 and the outer portion 9112 of the first upper plate springs 911, the parts number and be reduced and the soldering process can be eliminated effectively. Similarly, the integrally-formed structures between the other suspension wires 962~964 and the outer portion 9112 of the first upper plate spring 911 and the outer portion 9122 of the second upper plate spring 912 have the same function.

Figure 11:
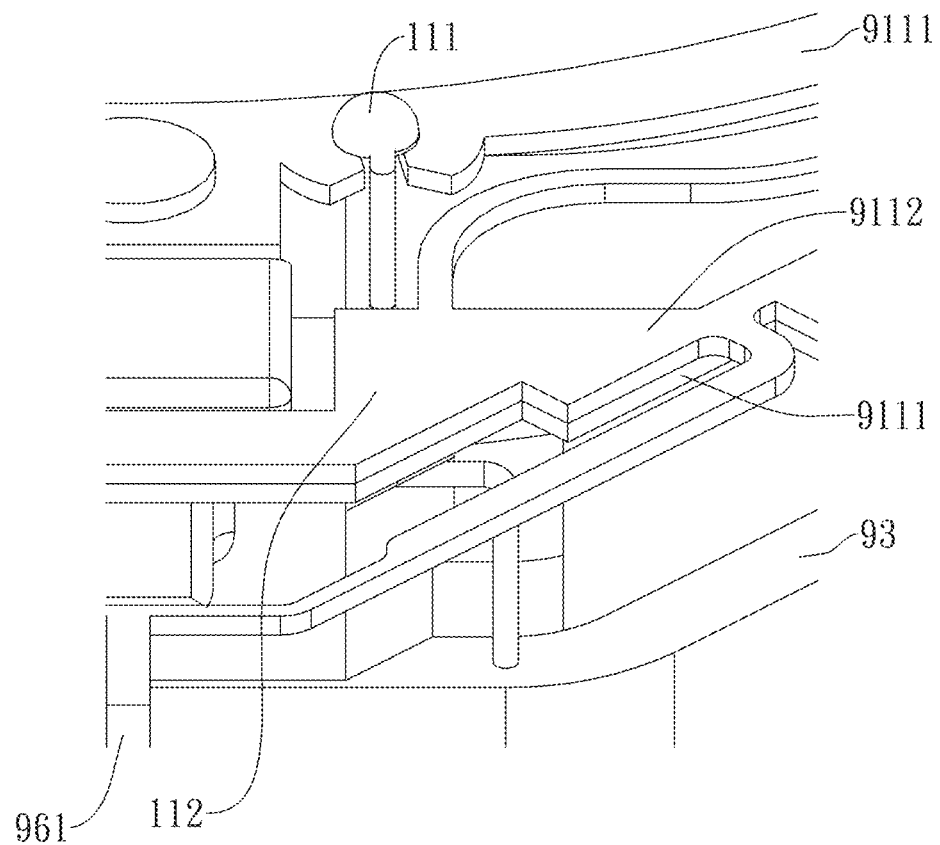
FIG. 11 is a partially enlarged bottom view showing the electrical connection between the focusing coil and the upper plate spring, of the lens driving device of FIG. 9.

FIG. 11 is a partially enlarged bottom view showing the electrical connection between the focusing coil and the upper plate spring, of the lens driving device of FIG. 9. As shown in FIG. 11, the focusing coil 93 is connected electrically to the inner portion 9111 of the first upper plate spring 911 with a soldered portion 111. Similarly, not shown in the figures, the focusing coil 63 is further connected electrically to the inner portion 9121 of the second upper plate spring 912 with another soldered portion. Therefore, the focusing coil 93 is connectedly to the first upper plate spring 911 and the second upper plate spring 912 through the inner portions thereof, so as to form a electrical loop of the flexible printed circuit 95, the four suspension wires 961~964, the upper plate springs 911~912, and the focusing coil 93.

To be noted, in this embodiment as shown in FIG. 11, the material of the upper plate spring must be electrical-conductive, and the overlapping area 112 between the inner portion and the outer portion must also be electrical-conductive. Therefore, electricity can be transmitted through the overlapping area 112.

Embodiment 3

Figure 12:
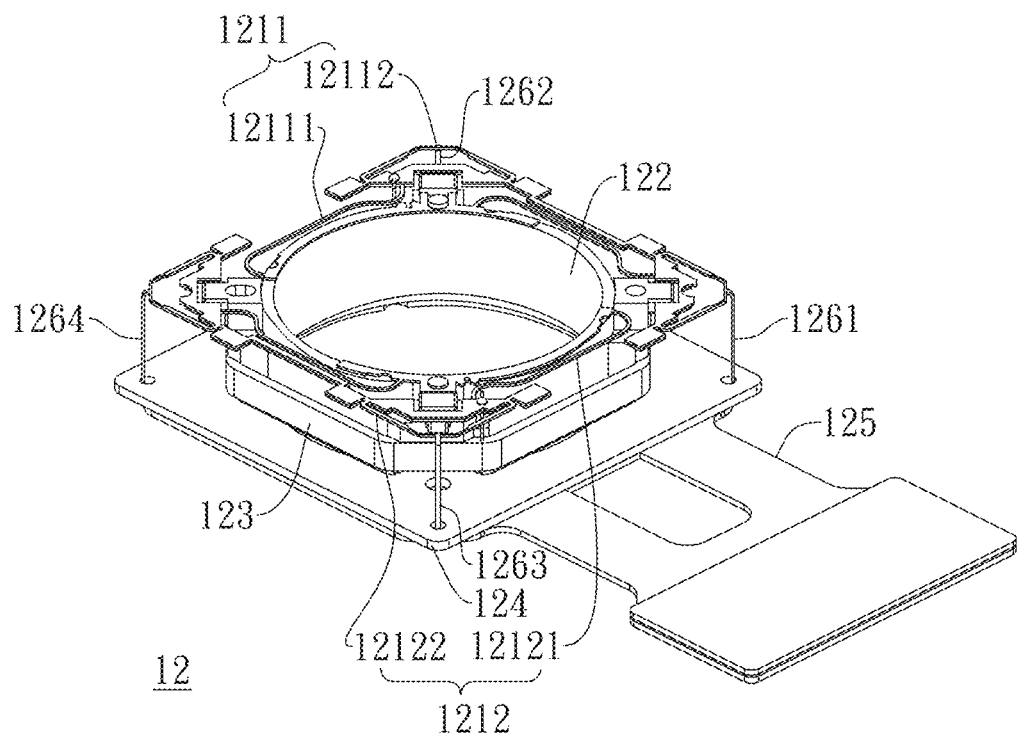
FIG. 12 is a schematic view showing the main structure of a lens driving device for a VCM according to the third embodiment of the present application.

FIG. 12 is a schematic view showing the main structure of a lens driving device for a VCM according to the third embodiment of the present application. For the convenience of description, some minor parts of the lens driving device are not shown. As shown in FIG. 12, the lens driving device 12 includes mainly an elastic support structure, having an upper plate spring portion and a plurality of suspension wires 1261~1264, a lens holder 122, a focusing coil 123, an OIS coil structure 124, and a flexible printed circuit 125, wherein the upper plate spring portion includes an first upper plate spring 1211 which includes an inner portion 12111 and an outer portion 12112, an second upper plate spring 1212 which includes an inner portion 12121 and an outer portion 12122, wherein the upper plate spring portion disposed on the top surface of the lens holder 122 to elastically hold the lens holder 122 along the optical axis.

The first upper plate spring 1211 and the second upper plate spring 1212 are disposed separately with each other and hence have no structural connection therebetween. The lens holder 122 (not shown) is for holding a lens which has an optical axis. The focusing coil 123 is disposed at a periphery of the lens with respect to the optical axis. The OIS coil structure 124 includes a plurality of coils (not shown) thereon and is disposed on a plane perpendicular to the optical axis. The flexible printed circuit 125 is connected electrically to the OIS coil structure 124 and takes control electrically of the OIS coil structure 94.

The lens driving device 12 includes two first suspension wires 1261~1262 and two second suspension wires 1263 and 1264. The first suspension wires 1261 and 1262 are respectively connected electrically to the flexible printed circuit 125 with one end, connected electrically to the outer portion 12112 of the first upper plate spring 911 with the other end, and are disposed substantially parallel with the optical axis. To be noted, the first suspension wires 1261 and 1262 are respectively integrally formed with or in one-piece form with outer portion 12112 of the first upper plate spring 1211.

The second suspension wires 1263 and 1264 are respectively connected electrically to the flexible printed circuit 125 with one end, connected electrically to the outer portion 12122 of the second upper plate spring 1212 with the other end, and are disposed substantially parallel with the optical axis. Similarly, the second suspension wires 1263 and 1264 are respectively integrally formed with or in one-piece form with the outer portion 12122 of the second upper plate spring 1212.

Figure 13:
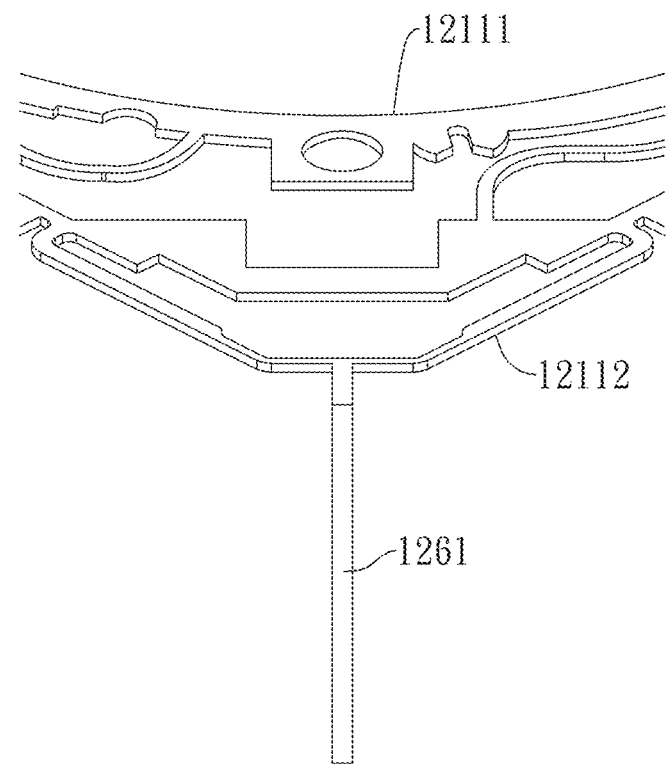
FIG. 13 is a partially enlarged top view showing the outer portion of the upper plate spring integrally-formed with the suspension wire of the lens driving device of FIG. 12.

FIG. 13 is a partially enlarged top view showing the outer portion of the upper plate spring integrally-formed with the suspension wire of the lens driving device of FIG. 12. As shown in FIG. 13, with the integrally-formed structure between the first suspension wires 1261 and the outer portion 12112 of the first upper plate springs 1211, the parts number and be reduced and the soldering process can be eliminated effectively. Similarly, the integrally-formed structures between the other suspension wires 1262~1264 and the outer portion 12112 of the first upper plate spring 1211 and the outer portion 12122 of the second upper plate spring 1212 have the same function.

Figure 14:
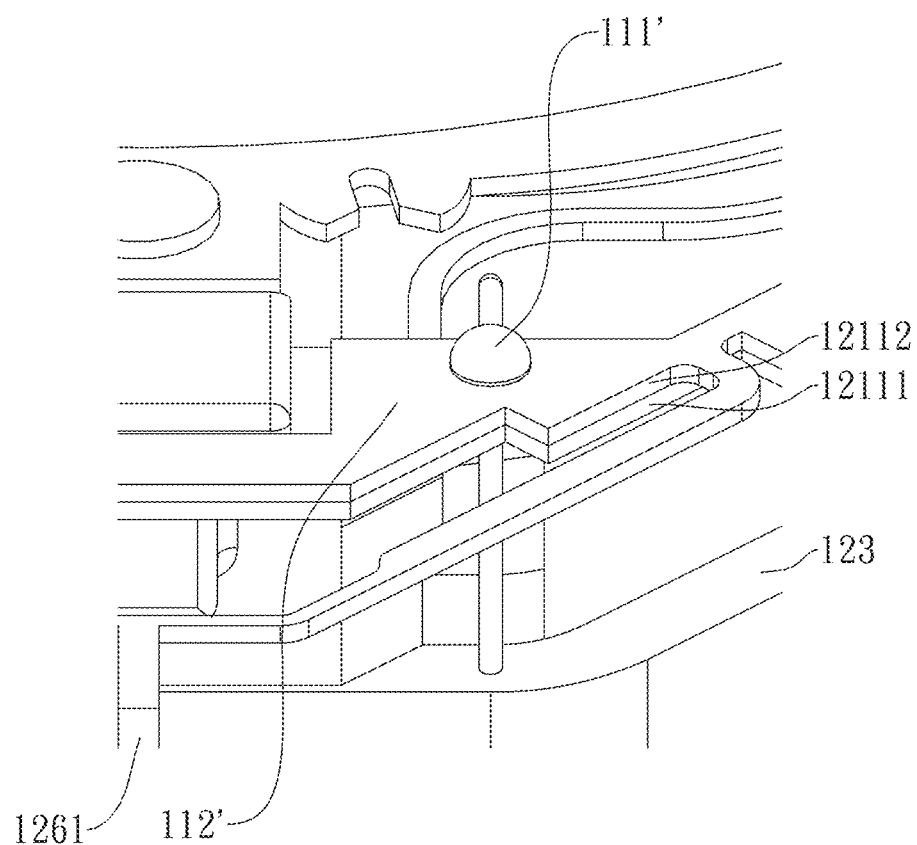
FIG. 14 is a partially enlarged bottom view showing the electrical connection between the focusing coil and the upper plate spring, of the lens driving device of FIG. 12.
Figure 15:
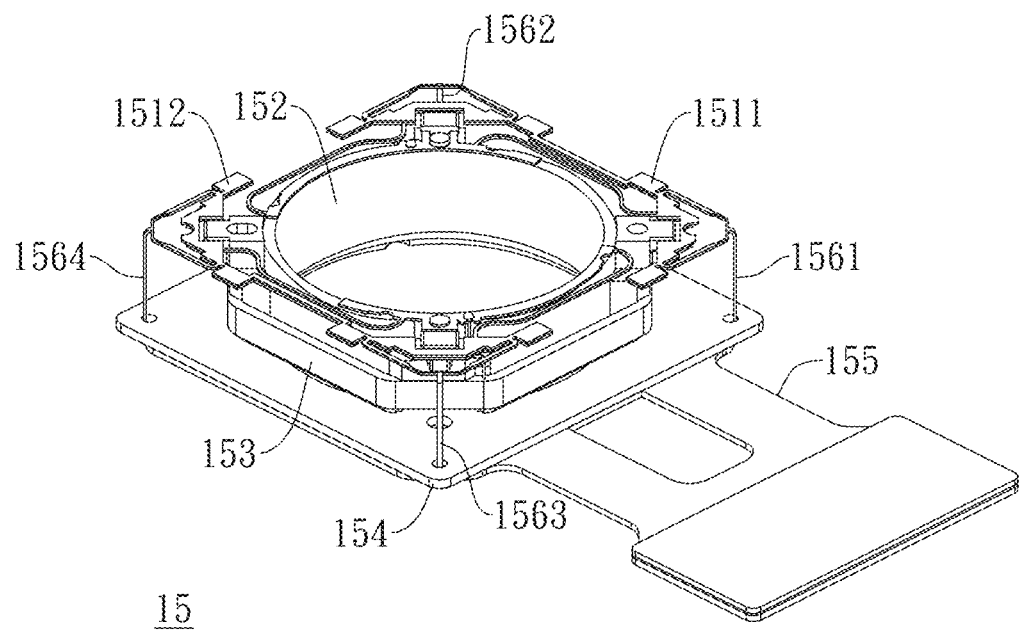
FIG. 15 is a schematic view showing the main structure of a conventional lens driving device for a voice coil motor.
Figure 16:
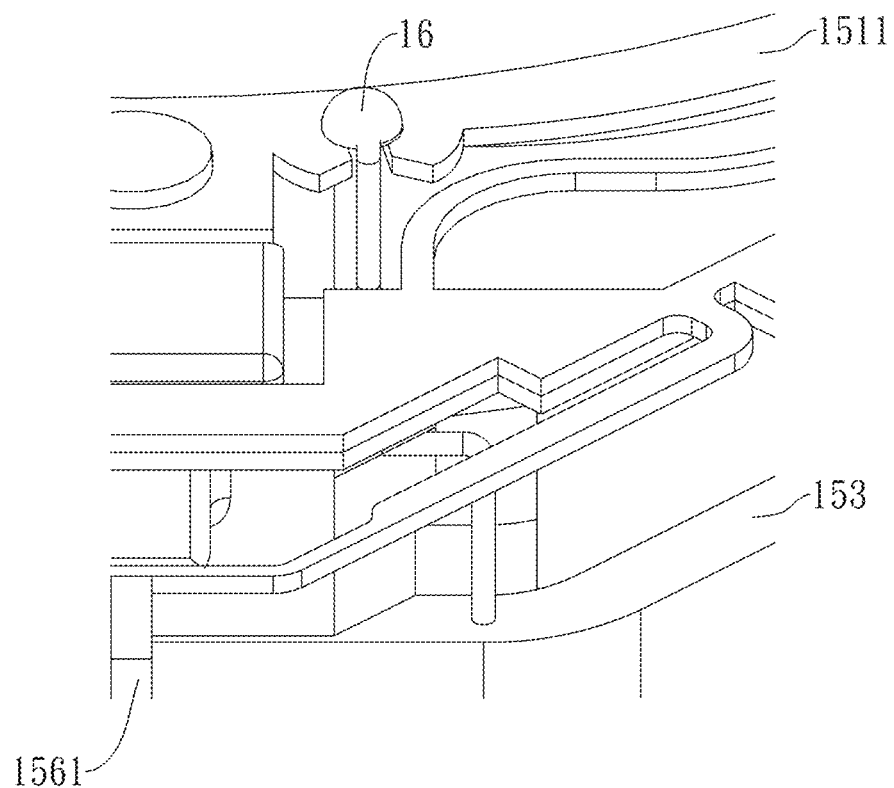
FIG. 16 is a partially enlarged top view showing the electrical connection between the focusing coil and the upper plate spring of the lens driving device of FIG. 15.
Figure 17:
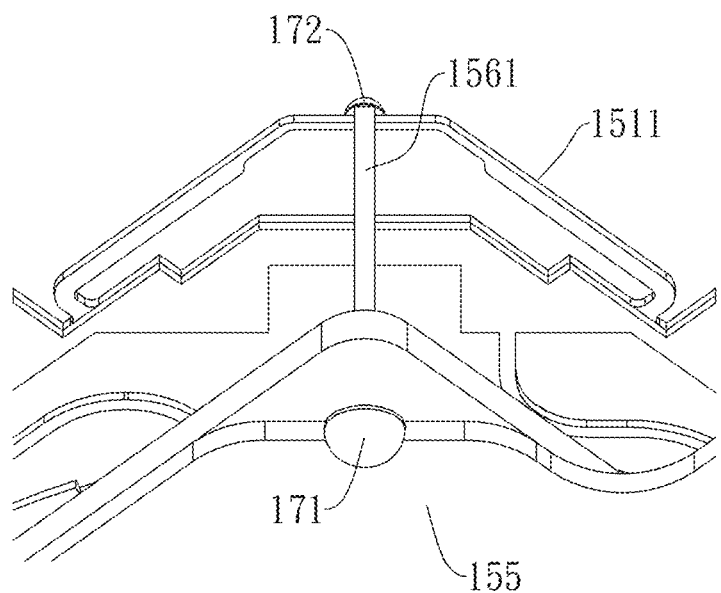
FIG. 17 is a partially enlarged bottom view showing the electrical connection between the flexible printed circuit and the suspension wire and the connection between the upper plate spring and the suspension wire, of the lens driving device of FIG. 15.

FIG. 14 is a partially enlarged bottom view showing the electrical connection between the focusing coil and the upper plate spring, of the lens driving device of FIG. 12. As shown in FIG. 14, the focusing coil 123 is connected electrically to the outer portion 12112 of the first upper plate spring 1211 with a soldered portion 111'. Similarly, not shown in the figures, the focusing coil 123 is further connected electrically to the outer portion 12122 of the second upper plate spring 1212 with another soldered portion. Therefore, the focusing coil 123 is connectedly to the first upper plate spring 1211 and the second upper plate spring 1212 through the outer portions thereof, so as to form a electrical loop of the flexible printed circuit 125, the four suspension wires 1261~1264, the upper plate springs 1211~1212, and the focusing coil 123.

To be noted, in this embodiment as shown in FIG. 14, the material of inner portions 12111 & 12121 of the upper plate spring can be electrical-insulated because the focusing coil 123 is connected electrically to the outer portion 12112 of the first upper plate spring 1211 and to the outer portion 12122 of the second upper plate spring 1212. In this situation, the overlapping area 112' between the inner portion and the outer portion fails to be electrical-conductive and electricity fails to be transmitted through the overlapping area 112'.

To sum up, the lens driving device of the present invention can provide a lens driving device with 3D elastic support structure by the suspension wires, which are all in one-piece form with or integrally formed with the upper plate springs, so as to reduce the parts number and to eliminate the soldering process.

The embodiments described above are exemplary and are not intended to limit the present invention. Any modification or alteration with the same effect made to the present invention without departing from the spirit and scope of the present invention shall fall within the scope of the appended claims.

What is claimed is:

1. A lens driving device, comprising:
   a lens holder for holding a lens having an optical axis;
   a focusing coil disposed at a periphery of the lens with respect to the optical axis;
   an optical image stabilizer (OIS) coil structure comprising a plurality of coils;
   a circuit structure connected electrically to the OIS coil structure and taking control thereof;
   a plurality of magnets; and
   an elastic support structure, having an upper plate spring portion and a plurality of suspension wires, wherein each suspension wire is disposed substantially parallel with the optical axis and integrally formed with the upper plate spring portion at one end and connected electrically to the circuit structure at the other end,
   wherein the upper plate spring portion includes at least a first upper plate spring and at least a second upper plate spring, and the plurality of suspension wires includes two first suspension wires and two second suspension wires,
   wherein the first upper plate spring comprises an inner portion and an outer portion connected electrically thereto,
   wherein the second upper plate spring comprises an inner portion and an outer portion connected electrically thereto,
   wherein each first suspension wire is integrally formed with the outer portion of the first upper plate spring at one end and is connected electrically to the circuit structure at the other end, and
   wherein each second suspension wire is integrally formed with the outer portion of the second upper plate spring at one end and is connected electrically to the circuit structure at the other end.

2. The lens driving device according to claim 1, wherein the upper plate spring portion elastically holds the lens holder along the optical axis.

3. The lens driving device according to claim 1, wherein each first suspension wire and each second suspension wire is disposed substantially parallel with the optical axis.

4. The lens driving device according to claim 1, wherein the focusing coil is connected electrically to the first upper plate spring and the second upper plate spring.

5. The lens driving device according to claim 1, wherein the focusing coil is connected electrically to the inner portion of the first upper plate spring and the inner portion of the second upper plate spring.

6. The lens driving device according to claim 1, wherein the OIS coil structure is disposed on a plane perpendicular to the optical axis.

7. The lens driving device according to claim 1, wherein the plurality of magnets comprises:
   a plurality of first magnets respectively having a first surface facing to the focusing coil; and
   a plurality of second magnets respectively having a second surface facing to the respective coil of the OIS coil structure.

8. The lens driving device according to claim 7, wherein the first magnets are the same with the second magnets.

9. The lens driving device according to claim 7, wherein the first magnets are different from the second magnets.

10. The lens driving device according to claim 1, wherein the circuit structure is a flexible printed circuit.

11. The lens driving device according to claim 1, wherein the upper plate spring portion disposed on the top surface of the lens holder.

12. A lens driving device, comprising:
    a lens holder for holding a lens having an optical axis;
    a focusing coil disposed at a periphery of the lens with respect to the optical axis;
    an optical image stabilizer (OIS) coil structure comprising a plurality of coils;
    a circuit structure connected electrically to the OIS coil structure and taking control thereof;
    a plurality of magnets; and
    an elastic support structure, having an upper plate spring portion and a plurality of suspension wires, wherein each suspension wire is disposed substantially parallel with the optical axis and integrally formed with the upper plate spring portion at one end and connected electrically to the circuit structure at the other end,
    wherein the upper plate spring portion includes at least a first upper plate spring and at least a second upper plate spring, and the plurality of suspension wires includes two first suspension wires and two second suspension wires,
    wherein the first upper plate spring comprises an inner portion and an outer portion having no electrical connection thereto,
    wherein the second upper plate spring comprises an inner portion and an outer portion having no electrical connection thereto,
    wherein each first suspension wire is integrally formed with the outer portion of the first upper plate spring at one end and is connected electrically to the circuit structure at the other end, and
    wherein each second suspension wire is integrally formed with the outer portion of the second upper plate spring at one end and is connected electrically to the circuit structure at the other end.

13. The lens driving device according to claim 12, wherein the focusing coil is connected electrically to the outer portion of the first upper plate spring and the outer portion of the second upper plate spring.

14. The lens driving device according to claim 12, wherein the upper plate spring portion elastically holds the lens holder along the optical axis.

15. The lens driving device according to claim 12, wherein each first suspension wire and each second suspension wire is disposed substantially parallel with the optical axis.

16. The lens driving device according to claim 12, wherein the focusing coil is connected electrically to the first upper plate spring and the second upper plate spring.

17. The lens driving device according to claim 12, wherein the OIS coil structure is disposed on a plane perpendicular to the optical axis.

18. The lens driving device according to claim 12, wherein the plurality of magnets comprises:
   a plurality of first magnets respectively having a first surface facing to the focusing coil; and
   a plurality of second magnets respectively having a second surface facing to the respective coil of the OIS coil structure.

19. The lens driving device according to claim 18, wherein the first magnets are the same with the second magnets.

20. The lens driving device according to claim 18, wherein the first magnets are different from the second magnets.

21. The lens driving device according to claim 12, wherein the circuit structure is a flexible printed circuit.

22. The lens driving device according to claim 12, wherein the upper plate spring portion disposed on the top surface of the lens holder.

\* \* \* \* \*